(12) United States Patent
Lee et al.

(10) Patent No.: US 9,204,760 B2
(45) Date of Patent: Dec. 8, 2015

(54) COLLAPSIBLE BOX GRATER

(71) Applicant: Robinson Home Products Inc., Williamsville, NY (US)

(72) Inventors: Stuart Harvey Lee, Forest Hills, NY (US); Jochen Schaepers, New York, NY (US)

(73) Assignee: Robinson Home Products Inc., Williamsville, NY (US)

( * ) Notice: Subject to any disclaimer, the term of this patent is extended or adjusted under 35 U.S.C. 154(b) by 6 days.

(21) Appl. No.: 14/188,487

(22) Filed: Feb. 24, 2014

(65) Prior Publication Data

US 2014/0246527 A1 Sep. 4, 2014

Related U.S. Application Data

(60) Provisional application No. 61/771,756, filed on Mar. 1, 2013.

(51) Int. Cl.
*A47J 43/25* (2006.01)

(52) U.S. Cl.
CPC .................................. *A47J 43/25* (2013.01)

(58) Field of Classification Search
CPC ............................. A47J 43/25; A47J 43/255
USPC ..................... 241/273.1–273.4, 95
See application file for complete search history.

(56) References Cited

U.S. PATENT DOCUMENTS

| | | |
|---|---|---|
| D259,759 S | 7/1981 | Williams |
| 5,312,054 A | 5/1994 | Feer et al. |
| D389,019 S | 1/1998 | Molo |
| 5,785,046 A * | 7/1998 | Colla ........................ 126/9 R |
| 6,135,375 A | 10/2000 | Kaposi et al. |
| D438,433 S | 3/2001 | Kaposi et al. |
| D448,256 S | 9/2001 | Ancona et al. |
| D548,549 S | 8/2007 | Curtin |
| D568,118 S | 5/2008 | Chalfant et al. |
| 7,469,848 B2 | 12/2008 | Yamanaka et al. |
| D593,817 S | 6/2009 | Eide et al. |
| 2004/0217219 A1 | 11/2004 | Bitonto et al. |
| 2005/0006505 A1 | 1/2005 | McNeeley et al. |
| 2006/0283994 A1 | 12/2006 | Webb et al. |
| 2011/0079670 A1 | 4/2011 | Ameli et al. |

* cited by examiner

*Primary Examiner* — Faye Francis
*Assistant Examiner* — Onekki Jolly
(74) *Attorney, Agent, or Firm* — Florek & Endres PLLC

(57) ABSTRACT

A grater having a first grater panel and a second grater panel pivotally connected at the top with folding side walls connected to the sides of the first and second panels so that the grater is collapsible from a working configuration, where the bottoms of the first and second panels are set apart from each other and the side walls are unfolded, to a stored configuration, where the bottoms of the first and second panels are substantially together and the side walls are folded. A handle is placed at the top of panels and a bottom may be used to close the area between the first and second panels and the side walls.

21 Claims, 7 Drawing Sheets

COLLAPSIBLE BOX GRATER

FIELD OF THE INVENTION

The present invention relates to kitchen accessories, and more particularly to a grater for grating and/or slicing food items.

BACKGROUND OF THE INVENTION

Graters are well known in the art to come in a variety of configurations. For example, flat handheld graters generally have a single grating surface on a single panel, where the grated particulates drop from the back of the grater, as shown in U.S. Pat. No. D448,256. The user can therefore direct the grated particulates from the back of the grating panel into a storage container or onto a food item. However, open handheld graters had only a single coarseness and provided limited control of errant particulates.

To permit the user to select from a variety of different coarseness variations, box graters were developed with different grating panels on different sides of a multi-sided utensil. This allowed a user to prepare grated particulates of different coarseness, including slices of one or more thicknesses (all referred to as "grated particulates"), with just a single utensil rather than needing a variety of different graters. However, due to the placement of different grating surfaces on different panels of the box grater, these multi-sided graters take up more space than a handheld grater formed of a single panel.

There have therefore been efforts to reduce the size of multi-sided or box graters. For example, U.S. Pat. Nos. 5,312,054 and D548,549 describe multi-sided graters formed of two panels in an inverted "V" where the two panels are pivotally attached at the top and fold together to reduce the overall volume. In another version, U.S. Patent Application Publication No. 2005/0006505 describes a three sided grater having a center panel connected to right and left panels by hinges, where the right and left panels can be snapped together or held in adjacent relation by a cap which can be fixed to the top of each of the panels. Unsnapping the right and left panels or removing the cap permits the three sided grater to be folded into a flat configuration.

Addressing a different aspect, graters have been adapted to include an integrated container or the like to catch the grated particulates rather than merely allowing the grated particulates to fall into an independent storage container or onto a food item. For example, U.S. Pat. Nos. D389,019 and 5,312,054 describe collection containers attached to the back surface of the panel having a grating surface. With respect to U.S. Pat. No. 5,312,054, the container fits between the folded panels so that the grater can be folded and stored with the container attached to one of the panels.

However, collapsible multi-panel graters still require improvement have not been shown with two grater panels that can both be folded down to a reduced size and include an integrated container for receiving the grated particulates from all of the grater panels simultaneously.

SUMMARY OF THE INVENTION

The present invention is directed to a grater comprising:
a first panel having a top, a bottom, a first side and a second side;
a second panel having a top, a bottom, a first side and a second side;
a first folding side wall connected to one of the first and second sides of the first panel and one of the first and second sides of the second panel;
a second folding side wall connected to the other of the first and second sides of the first panel and the other of the first and second sides of the second panel;
a pivot connection coupling the tops of the first and second panels; and
a handle coupled to at least one of the top of the first and second panel,
wherein the grater is collapsible from an open configuration, where the bottoms of the first and second panels are set apart from each other and the side walls are in an unfolded orientation, and a closed configuration, where the bottoms of the first and second panels are substantially together and the side walls are in a folded orientation.

The grater of the present invention preferably further comprises a bottom panel cooperating with the bottoms of the first and second panels to hold the grater in an open configuration. Preferably, the bottom panel comprises a pivot connection at the bottom of one of the first and second panels and a catch member to releasably engage the bottom of the other of the first and second panels, where the bottom panel can pivot from a stored position against one of the first and second panels to a working position between the bottoms of the first and second panels. In this way, the bottom panel fixed in its working position secures the grater in its open configuration.

In the most preferred embodiment, the first and second folding side walls are positioned with a lower edge adjacent the bottom of the first and second panels, so that when the bottom panel is fixed in its working position it creates a container bounded by the first and second panels, the first and second side walls and the bottom panel. This container catches the grated particulates from either the first or the second panel and releases the grated particulates when engagement of the catch member of the bottom panel is released.

To more reliably enclose the container formed by the bottom panel when fixed in its working position, it is preferred that the bottom panel include ribs just inside the side edges, fitting inside the side walls when in the open configuration, to limit any opening between the bottom panel and the side walls. Additionally, the bottom panel preferably includes a tab on the side of the catch member to assist in overcoming the connection force of the catch and removal of the bottom panel from its working position.

Of course, if the user does not wish to catch the grated particulate, for example when the grated particulate is to be grated directly onto a food item, the bottom panel can be removed or pivoted out of the way.

In its preferred embodiment, the side walls are formed of a flexible material such as a thermoplastic elastomeric material, with two living hinges that permit the folded sections of the side walls to lay flat against each other when the grater is in its closed configuration. Moreover, it is most preferred that one of the first or second panel have a width that is less than the width of the other, so that when the grater is in the closed configuration the flat folded sections of the side wall fit within the width of the wider first or second panel.

Other features are preferably incorporated into the grater of the present invention, including an elastomeric material formed on at least an outer portion of the handle, for user comfort, and the bottom surfaces of the feet on the bottoms of the first and second panels, to prevent slippage of the grater placed on a surface when in use.

BRIEF DESCRIPTION OF THE DRAWINGS

The attached drawings are intended to better illustrate a preferred embodiment of the present invention without limiting the invention in any manner whatsoever.

DETAILED DESCRIPTION OF THE PREFERRED EMBODIMENTS

Figure 1:
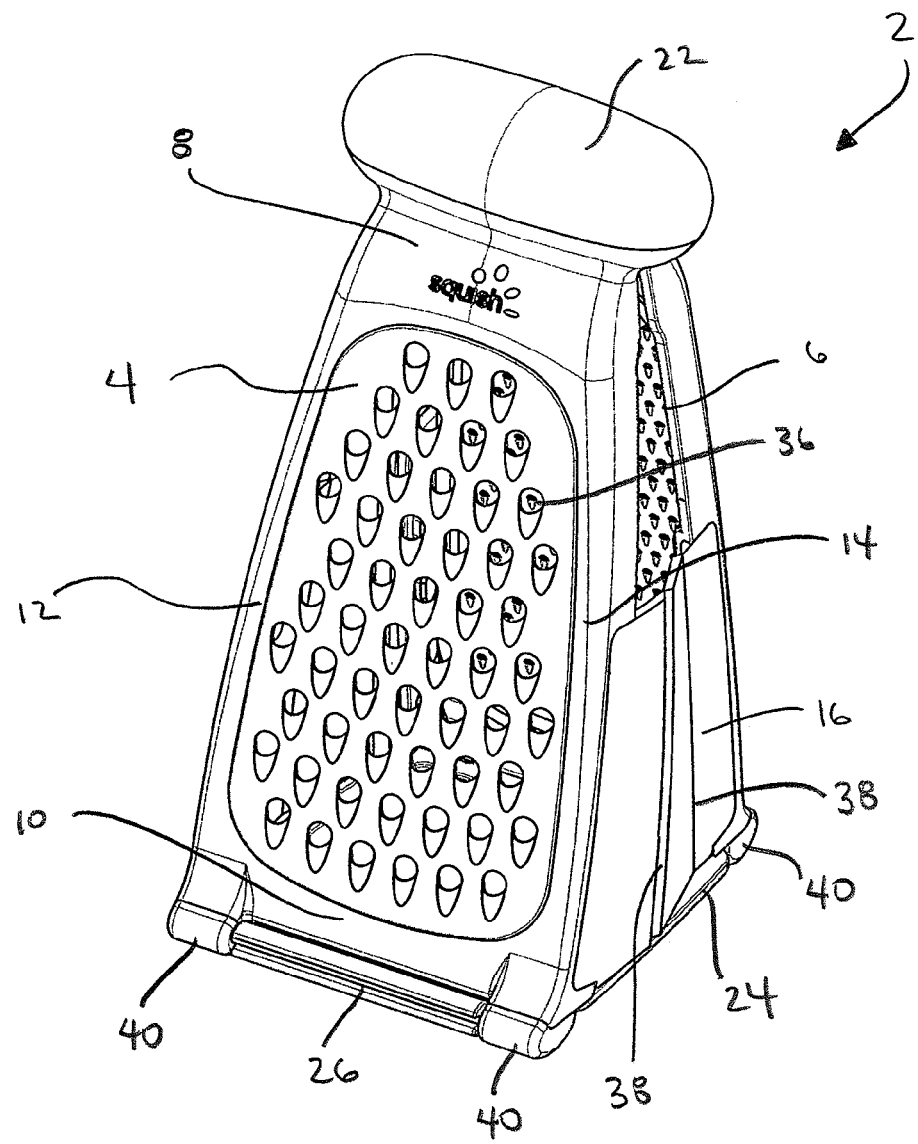
FIG. 1 is a perspective view of the preferred embodiment of the grater of the present invention in its open configuration.
Figure 2:
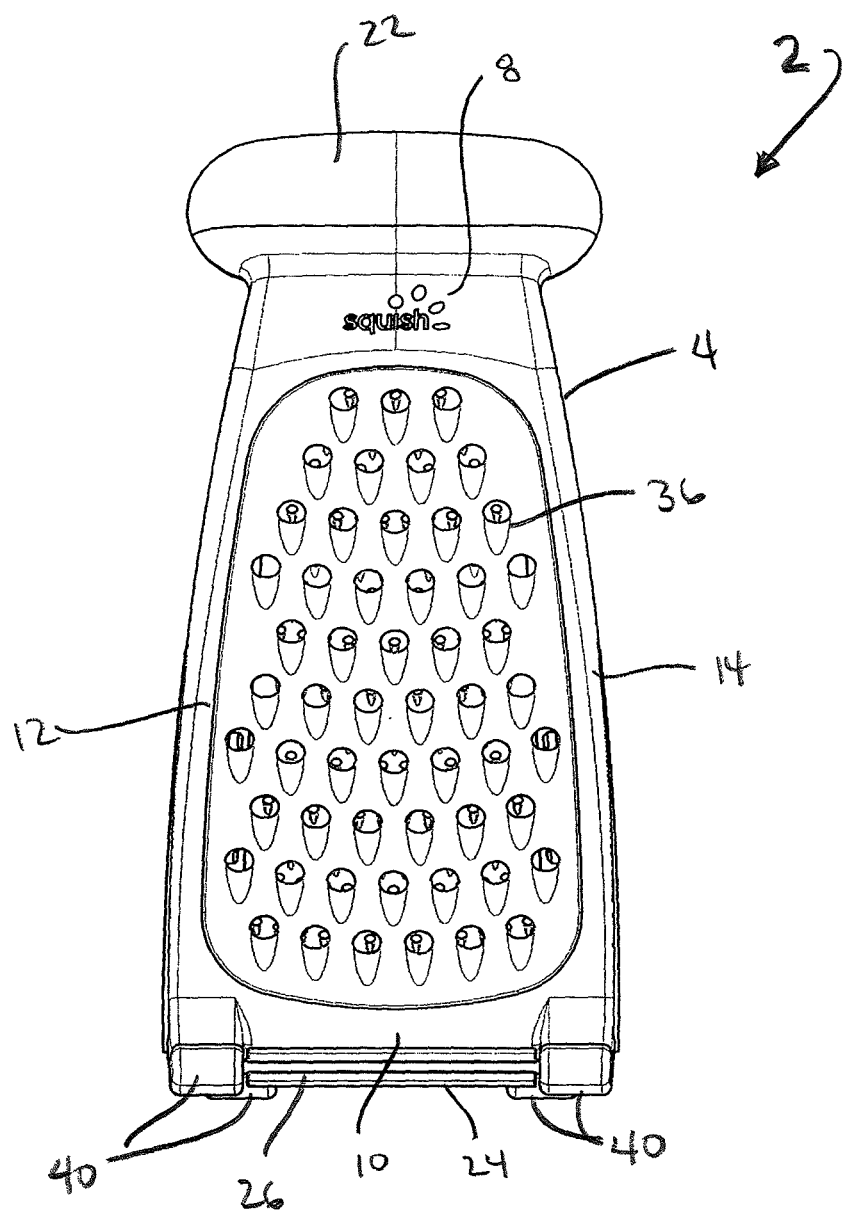
FIG. 2 is a front view of the preferred embodiment of the grater of the present invention in its open configuration.

The following description of preferred embodiment is presented to describe the present invention and is not to be construed to limit the scope of the claims in any manner whatsoever.

As best shown in the drawings, and especially FIGS. 1, 2, 4 and 5, the preferred embodiment of the present invention is directed to a grater 2 comprising a first grater panel 4 and a second grater panel 6, the first and second grater panels 4, 6 respectively having a top 8, 8', a bottom 10, 10', a first side 12, 12' and a second side 14, 14', as well as a folding side walls 16 connecting the sides 12 and 14 and 12' and 14' of the first and second grater panels 4, 6.

Figure 6:
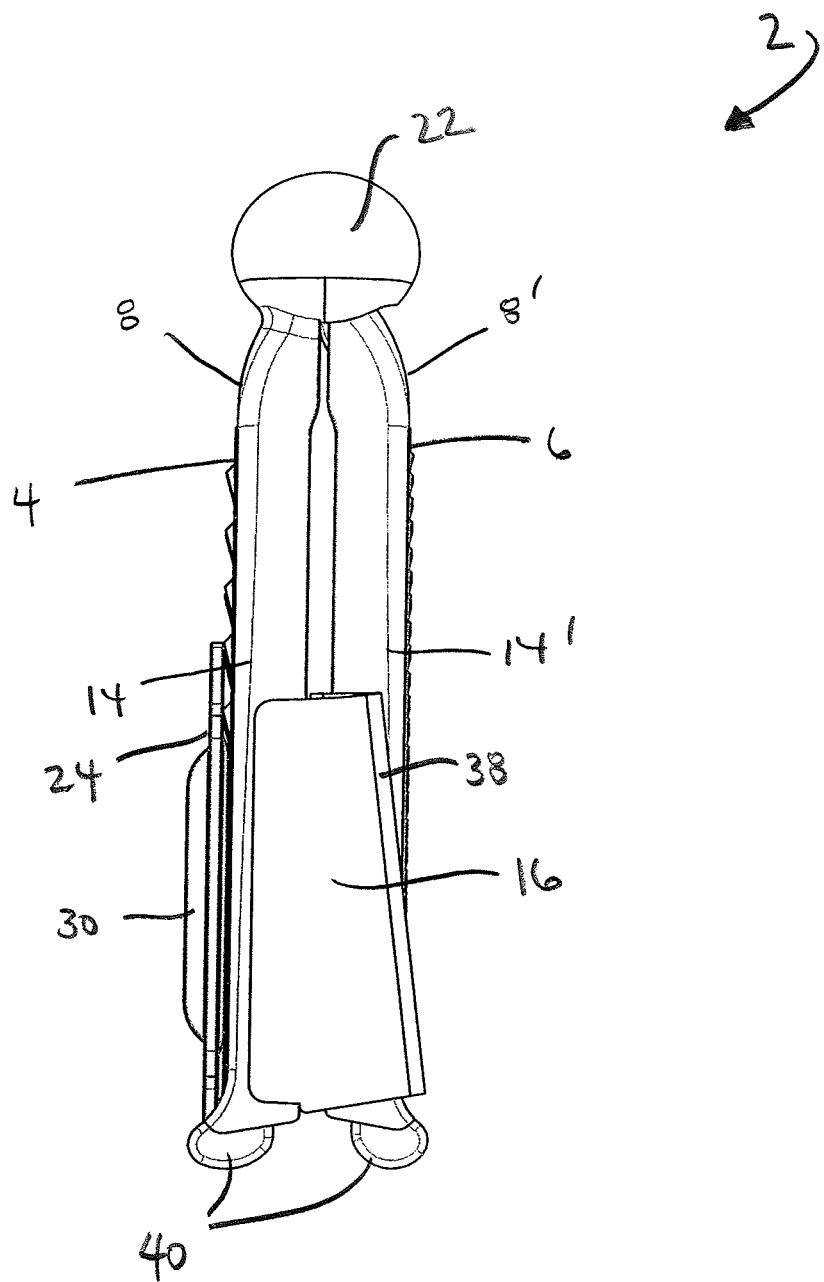
FIG. 6 is a side view of the preferred embodiment of the grater of the present invention in its closed configuration.
Figure 7:
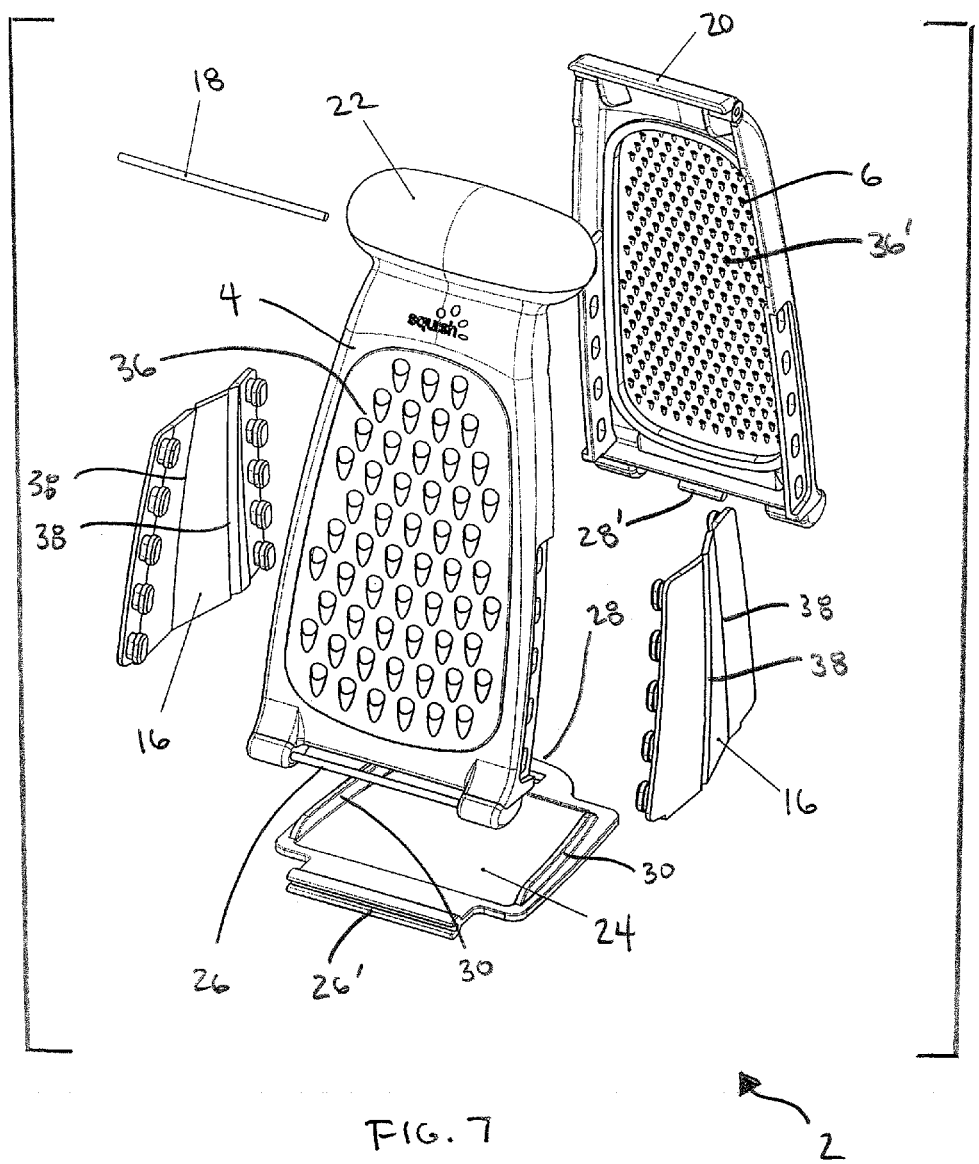
FIG. 7 is an exploded view of the preferred embodiment of the grater of the present invention.

As shown, the tops 8, 8' of the first grater panel 4 and second grater panel 6 are pivotally connected, preferably with the use of a pivot pin 18 that passes through cooperating pivot attachments 20 (see FIG. 7). This pivotal connection permits the grater to adapt from an open configuration shown in FIG. 5, where the bottoms 10, 10' of the first and second panels 2, 4 are set apart from each other and the side walls 16 are in an unfolded orientation, to a closed configuration shown in FIG. 6, where the bottoms 10, 10' of the first and second panels 2, 4 are substantially together and the side walls 16 are in a folded orientation.

In the preferred embodiment shown, a handle 22 associated with at the tops 8, 8' of the first and second grater panels 4, 6 covers the pivot pin 18 and pivot attachments 20. It is preferred that the handle 22 be formed of, including or coated with an elastomeric material that provides a sure and comfortable surface for the user to grasp.

The grater 2 preferably further comprises a bottom panel 24 cooperating with the bottoms 10, 10' of the first and second panels 4, 6 to hold the grater 2 in an open configuration. Preferably, the bottom panel 24 comprises pivot members 26, 26' at the bottom of the first panel 4 and catch members 28, 28' to releasably engage the bottom of the second panel 6. The pivot members 26, 26' allow the bottom panel 24 to pivot from a stored position against the first panel 4 to a working position when the catch member 28 of the bottom panel 24 engages the catch member 28' of the second panel 6. In this way, the bottom panel 24 fixed in its working position secures the grater 2 in its open configuration.

In the preferred embodiment, a container can be formed from the closed bottom panel 24, first and second grater panels 4, 6 and the folding side walls 16 when the folding side walls 16 are positioned with a lower edge adjacent the bottom 10, 10' of the first and second panels 4, 6. This container catches the grated particulates from either the first panel 4 or the second panel 6 without reconfiguring the container, and releases the grated particulates when the catch member 28 of the bottom panel 24 is released from the catch member 28' of the second panel 6.

To more reliably enclose the container formed by the bottom panel 24 when fixed in its working position, it is preferred that the bottom panel 24 includes ribs 30 just inside the side edges. Placement of the ribs 30 just inside the side walls 16 when the grater 2 is in its open configuration with the bottom panel 24 secured limits any opening between the bottom panel 24 and the side walls 16. Additionally, the bottom panel 24 preferably includes a tab 34 to assist in overcoming the connection force of the catch members 28, 28', for the removal of the bottom panel 24 from the second panel 6.

Figure 3:
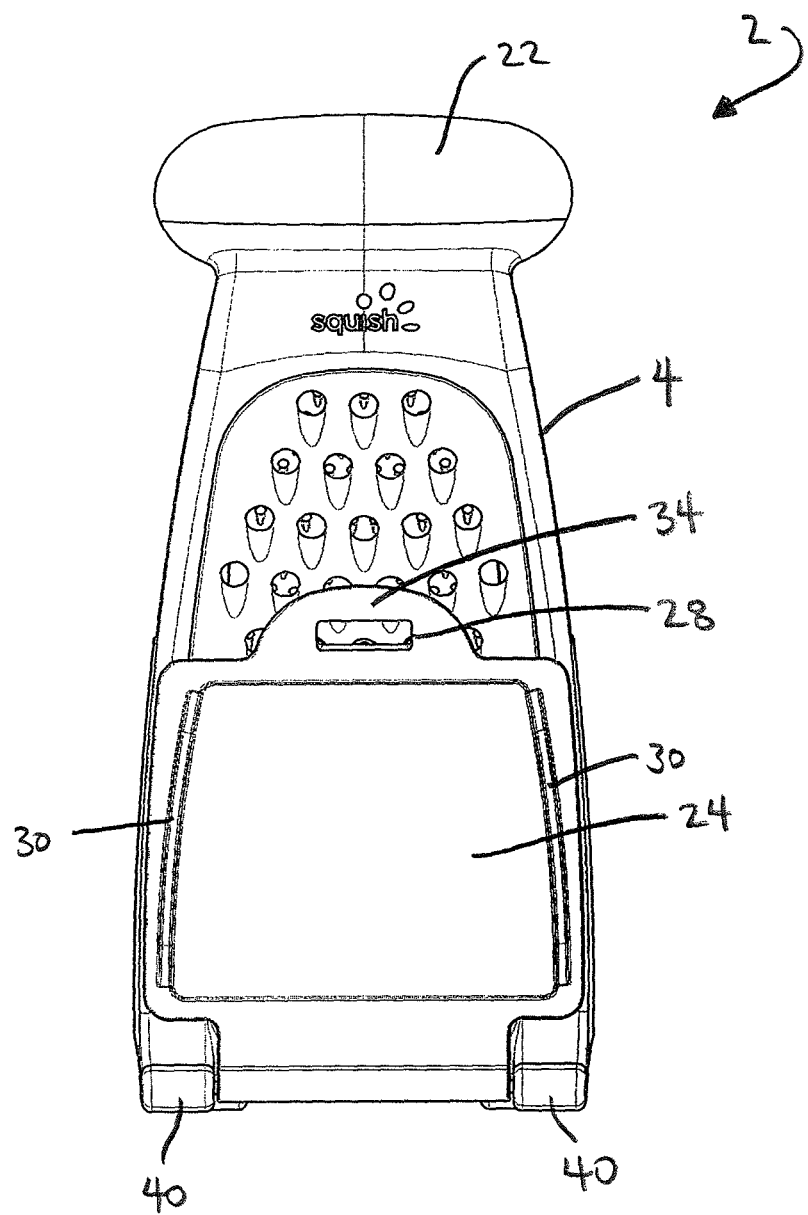
FIG. 3 is a front view of the preferred embodiment of the grater of the present invention in its closed configuration.

Of course, if the user does not wish to catch the grated particulate, for example when the grated particulate is to be grated directly onto a food item, the bottom panel 24 can be removed or pivoted out of the way, as is shown in FIG. 3.

In its preferred embodiment, the first and second panels and bottom panel 24 are formed of a substantially rigid material, with plastic being most preferred for the panels and metal being most preferred for the grater inserts 36, 36' on the first and second panels 4, 6, respectively. It is understood that the grater inserts 36, 36' preferably provide different cutting features, including but not limited to fine, medium and large coarse particulates as well as slicing blades providing for any suitable thicknesses.

Figure 4:
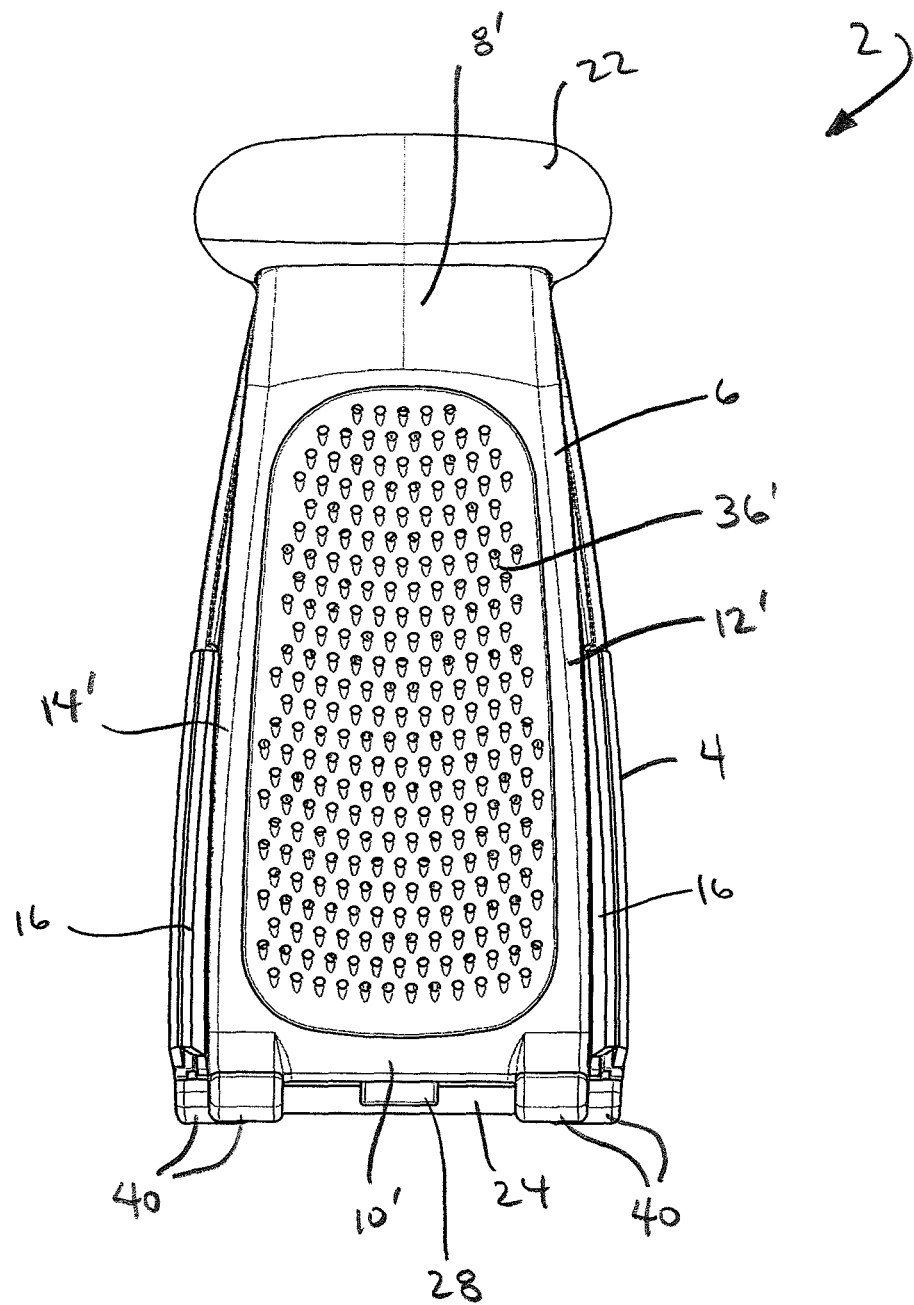
FIG. 4 is a rear view of the preferred embodiment of the grater of the present invention in its closed configuration.
Figure 5:
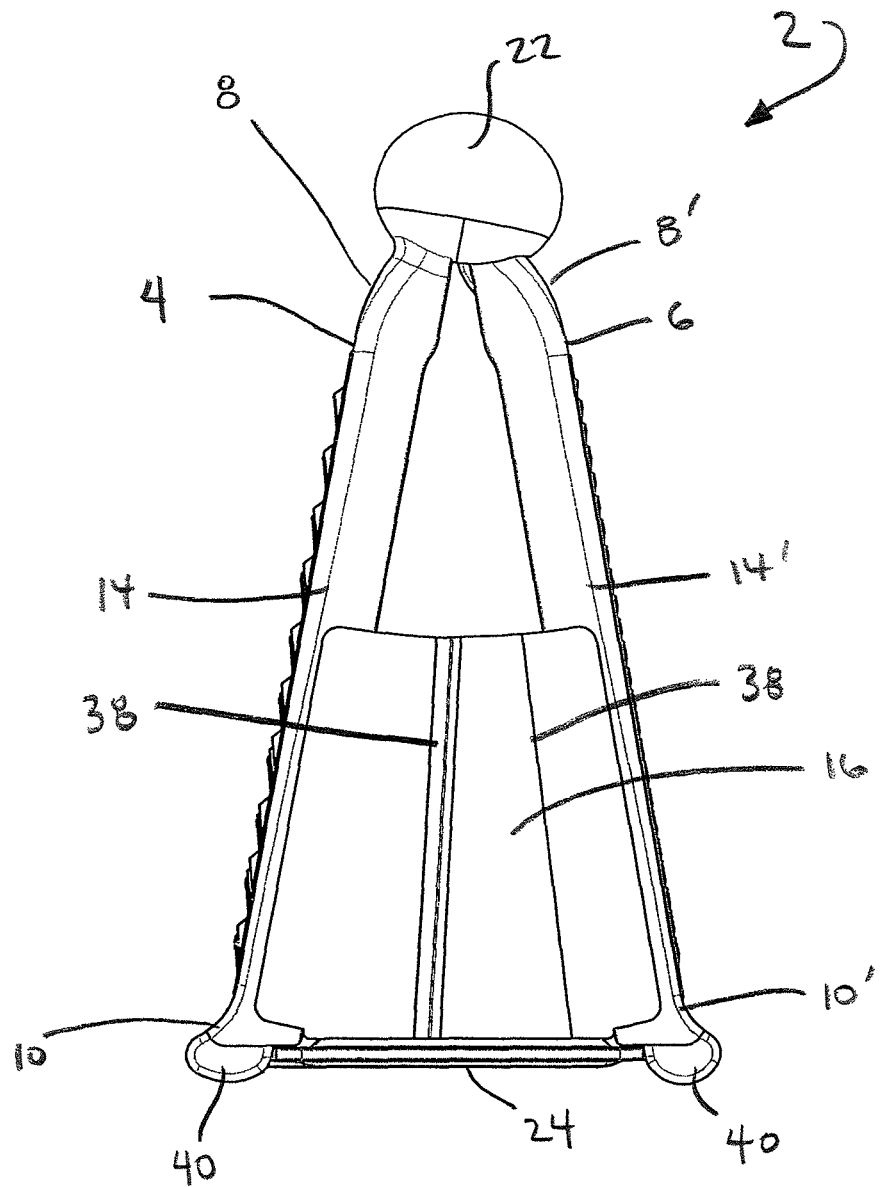
FIG. 5 is a side view of the preferred embodiment of the grater of the present invention in its open configuration.

The side walls 16 are preferably formed of a flexible material such as a thermoplastic elastomeric material, with two living hinges 38 that permit the folded sections of the side walls 16 to lay flat against each other when the grater 2 is in its closed configuration (see FIG. 4).

Moreover, it is most preferred that the second panel 6 has a width that is less than the width of the first panel 4, so that when the grater 2 is in the closed configuration the flat folded sections of the side wall 16 fit within the width of the first panel 4 (as shown in FIG. 4).

It is also preferred that the grater 2 of the present invention have feet 40 on the corners related to the bottom sides of the first and second panels 4, 6. The feet 40 are most preferably formed of or coated with an elastomeric material to prevent slippage of the grater 2 placed on a surface when in use.

Variations, modifications and alterations to the above detailed description will be apparent to those skilled in the art. All such variations, modifications and/or alternatives are intended to fall within the scope of the present invention, limited only by the appended claims. All cited patents and publications are hereby incorporated by reference.

We claim:

1. A grater comprising:
   a first panel having a top, a bottom, a first side and a second side;
   a second panel having a top, a bottom, a first side and a second side;
   a grating surface on at least a portion of at least one of the first panel and the second panel;
   a first folding side wall connected to one of the first and second sides of the first panel and one of the first and second sides of the second panel;
   a second folding side wall connected to the other of the first and second sides of the first panel and the other of the first and second sides of the second panel;
   a pivot connection coupling the tops of the first and second panels; and a handle coupled to at least one of the top of the first and second panel, wherein the grater is collapsible from a working configuration, where the bottoms of the first and second panels are set apart from each other and the side walls are in an unfolded orientation, to a stored configuration, where the bottoms of the first and second panels are substantially together and the side walls are in a folded orientation.

2. The grater of claim 1 wherein each of the first and second folding side walls are pivotally connected to at least one of the first and second panels.

3. The grater of claim 1 wherein each of the first and second folding side walls are pivotally connected to each of the first and second panels.

4. The grater of claim 1 wherein each of the first and second folding side walls are pivotally connected to each of the first and second panels and said first and second folding side walls have at least one pivotal connection intermediate the pivotal connections between the first and second panels.

5. The grater of claim 4 wherein the folding side walls each have two pivotal connections between the first panel and the second panel in the form of living hinges.

6. The grater of claim 1 further comprising a bottom panel movable from an open configuration, where the bottom panel engages one of the first and second panels when the grater is in its stored configuration, to a closed configuration, where the bottom panel engages both the first and second panels when the grater is in its working configuration.

7. The grater of claim 6 wherein the bottom panel comprises a pivot member at the bottom of one of the first and second panels and a catch member on the other of the first and second panels.

8. The grater of claim 6 wherein the first and second folding side walls are positioned with a lower edge adjacent the bottoms of the first and second panels, so that when the grater is in its working configuration and the bottom panel is fixed in its closed configuration it creates a container bounded by the first and second panels, the first and second side walls and the bottom panel.

9. The grater of claim 8 wherein the bottom panel further comprises ribs just inside side edges, fitting inside the side walls when the grater is in its working configuration and the bottom panel is in its closed configuration.

10. The grater of claim 6 wherein the bottom panel further comprises one or more tabs to assist in converting the bottom panel from its closed to its open configuration.

11. The grater of claim 1 wherein the handle further comprises an elastomeric material on at least a portion of the handle.

12. The grater of claim 1 further comprising feet for supporting the grater.

13. The grater of claim 12 wherein the feet comprise an elastomeric material on at least a bottom surface of the feet.

14. The grater of claim 1 wherein the side walls are formed at least in part of a thermoplastic elastomeric material with living hinges for folding the side walls.

15. The grater of claim 1 wherein one of the first and second panel have a width that is less than the width of the other, so that when in the grater is in the closed configuration the folded sections of the side wall fit adjacent the sides of the panel having a lesser width.

16. The grater of claim 1 wherein the first and second side walls each have a top and a bottom, and further wherein the width of the first and second side walls increase from the top to the bottom.

17. A grater comprising:
a first panel having a top, a bottom, a first side and a second side;
a second panel having a top, a bottom, a first side and a second side;
a grating surface on at least a portion of at least one of the first panel and the second panel;
a first folding side wall connected to one of the first and second sides of the first panel and one of the first and second sides of the second panel;
a second folding side wall connected to the other of the first and second sides of the first panel and the other of the first and second sides of the second panel;
a pivot connection coupling the tops of the first and second panels;
a handle coupled to at least one of the top of the first and second panel; and
a bottom panel movable from an open configuration, where the bottom panel engages one of the first and second panels, to a closed configuration, where the bottom panel engages both the first and second panels,
wherein the grater is collapsible from a working configuration, where the bottoms of the first and second panels are set apart from each other, the side walls are in an unfolded orientation and the bottom panel is in its closed configuration, to a stored configuration, where the bottoms of the first and second panels are substantially together, the side walls are in a folded orientation and the bottom panel is in its open configuration.

18. The grater of claim 17 wherein the bottom panel comprises a pivot member at the bottom of one of the first and second panels and a catch member on the other of the first and second panels.

19. The grater of claim 17 wherein the first and second folding side walls are positioned with a lower edge adjacent the bottoms of the first and second panels, so that when the grater is in its working configuration and the bottom panel is fixed in its closed configuration it creates a container bounded by the first and second panels, the first and second side walls and the bottom panel.

20. The grater of claim 19 wherein the bottom panel further comprises ribs just inside side edges, fitting inside the side walls when the grater is in its working configuration and the bottom panel is in its closed configuration.

21. The grater of claim 17 wherein the bottom panel further comprises one or more tabs to assist in converting the bottom panel from its closed to its open configuration.

* * * * *